US006803875B1

(12) United States Patent
Alford et al.

(10) Patent No.: US 6,803,875 B1
(45) Date of Patent: Oct. 12, 2004

(54) SIMULATNEOUS DUAL POLARIZATION RADAR SYSTEM

(75) Inventors: James Larry Alford, Enterprise, AL (US); James Rogers Helvin, Enterprise, AL (US)

(73) Assignee: DRS Weather Systems, Inc., Enterprise, AL (US)

( * ) Notice: Subject to any disclaimer, the term of this patent is extended or adjusted under 35 U.S.C. 154(b) by 0 days.

(21) Appl. No.: 10/393,732

(22) Filed: Mar. 21, 2003

Related U.S. Application Data (60) Provisional application No. 60/412,333, filed on Sep. 20, 2002.

(51) Int. Cl.[7] .............................................. G01S 13/00
(52) U.S. Cl. ....................................... 342/26; 342/188
(58) Field of Search ......................... 342/26, 188, 460; 702/2, 3, 4

(56) References Cited

U.S. PATENT DOCUMENTS

| | | | | |
|---|---|---|---|---|
| 4,684,951 A | * | 8/1987 | Baumer | 342/362 |
| 4,868,917 A | * | 9/1989 | Woolcock | 342/26 |
| 5,500,646 A | | 3/1996 | Zrnic | 342/188 |
| 5,621,410 A | * | 4/1997 | Gray et al. | 342/26 |
| 5,793,334 A | | 8/1998 | Anderson et al. | 343/786 |
| 5,940,776 A | | 8/1999 | Baron et al. | 702/4 |
| 6,061,013 A | * | 5/2000 | Sauvageot et al. | 342/26 |

OTHER PUBLICATIONS

Ryzhkov A., R. Lopez, R. Fulton, D. Zrnic, T. Schuur, and Y. Liu. "Hydrometeor Classification with a Polarimetric Radar for Improved Rainfall Measurements and Detection of Hail and Electrically Charged Regions." Preprints, 29th Conference on Radar Meteorology. Montreal, Canada: American Meterological Society, 1999; pps. 289–292.
Next Generation Weather Radar Program Operational Support Facility.
Skolnik, Merrill I. "Introduction to Radar Systems." New York: 3rd ed 2001.
Vivekanandan, J., D.S. Zrnic, S.M. Ellis, R. Oye, A. V. Ryzhkov, and J. Straka. "Cloud Microphysics Retrieval Using S–band Dual–polarization Radar Measurements." Bulletin of the American Meterolosical Society 1999: pps. 381–388.
Zahrai Allen and Dr. Dusan Zrnic. "Implementation of Polarimetric Capability for the WSR–88D (NEXRAD) Radar." Long Beach, CA. American Meteorological Society 1997.
Zrnie, D.S., and A.V. Ryzhkov, "Polarimetry for Weather Surveillance Radars." Bulletin of the American Meterological Society 1999: pps. 389–406.
Zrnic, D.S., Zahrai, A., Doviak, R.J., Carter, J., and Torres, S. "Polarimetric Upgrades of the NOAA's WSR–88D Research and Deveopment Radar" 7.14.
Doviak, R.J., V. Bringi, A. Ryzhkov, A. Zahrai, D.S. Zrnic'. "Considerations for Polarimetric Upgrades too Operational WSR–88D Radars." Journal of Atmospheric and Oceanic Technology, Mar. 2000, vol. 17, pps. 257–278.
Liu, Y., J.W. Conway, E.A. Brandes, A.V. Rzyhkov, J. Vivekanandan, D.S. Zrnic, and R. Oye. "The Use of Polarization Data in the Operational Identification of Hydrometeor and Non–hydrometeor Targets." Preprints, 29th Conf. Radar Meteor. Montreal, Canada: American Meteorological Society 1999: pps. 178–179.

* cited by examiner

*Primary Examiner*—Bernarr E. Gregory
*Assistant Examiner*—Brian Andrea
(74) *Attorney, Agent, or Firm*—Russell Carter Gache Sirote & Permutt, P.C.

(57) ABSTRACT

A simultaneous dual polarization radar system is disclosed that utilizes a RF power divider to replace high speed dual polarization switches utilized in current dual polarized radar systems. The disclosed systems allow for transmission and reception in both horizontal and vertical signal modes simultaneously while repositioning critical receiver components above the elevation rotary coupler in a radar pedestal. A bypass switch is also utilized to allow for mode switching of a radar system and a dual polarization reception design is shown to allow for the economical capturing of linear depolarization ratios of selected atmospheric areas. These new designs eliminate the current problems experienced in current dual polarization radar system of long dwell times and velocity range reductions, and the elimination of the relatively expensive and unreliable polarization switch.

20 Claims, 5 Drawing Sheets

SIMULATNEOUS DUAL POLARIZATION RADAR SYSTEM

This application claims the benefit of Provisional application Ser. No. 60/412,333, filed Sep. 20, 2002.

FIELD OF THE INVENTION

The present invention relates generally to weather radar systems. In further particularity the present invention relates to Doppler weather radar systems utilizing dual polarization to enhance reflectivity resolutions of liquid hydrometeors.

BACKGROUND OF THE INVENTION

The majority of weather radar systems in operation today utilize a single polarization strategy to enhance precipitation reflectivity. Liquid hydrometeors (e.g. raindrops) deviate from a sphere when their radius is greater than about 1 mm and have a shape more like that of an oblate spheroid with a flattened base (similar to a hamburger bun) that gives a slightly stronger horizontal return. Hence, current radar systems are typically horizontally polarized to enhance precipitation returns.

However, singly polarized radar systems have severe limitations in regions with partial beam blockage and such systems do not facilitate hydrometeor classification. To overcome these shortcomings of singly polarized weather radar systems, systems with is alternating pulses of horizontally and vertically polarized signals have been developed. These dual polarized radar system, sometimes referred to as "polarimetric weather radars," offer several advantages over conventional radars in estimating precipitation types and amounts. Foremost among these advantages are the capability to discriminate between hail and rain, detect mixed phase precipitation, and estimate rainfall volume.

Current dual polarized radar systems utilize polarization that is altered sequentially between linear vertical and linear horizontal to capture data enhancing values, such as, for example: (1) reflectivity factors at both horizontal and vertical polarization; (2) differential reflectivity for two reflectivity factors; (3) cumulative differential phasing between the horizontally and vertically polarized echoes; (4) correlation coefficients between vertically and horizontally polarized echoes; and (5) linear depolarization ratios. In addition, Doppler velocity and spectrum width can be obtained by suitably processing the horizontally and vertically polarized return signals.

Dual polarized radar systems also allow for the implementation of precipitation classification schemes from inference radar processing of hydrometeor shapes as discussed in various papers authored by practitioners who work in these areas, such as, Ryzhkov, Liu, Vivekanandan, and Zrnic. In addition, by looking at phase differences between the horizontal and vertical components, the effects of partial beam blockage can be mitigated and greater clutter rejection can be obtained. However, the underlying assumption is that subsequent pulses (those of each polarization) are highly correlated and provide an effective velocity range reduced by a factor of two.

While dual polarized radar systems provide enhanced resolving of hydrometeor data, current systems typically utilize high power, high speed waveguide switches to transfer the transmitted energy between dual waveguide conduits. The use of waveguide switches to separate orthogonally oriented energy waves has practical limitations that inhibit the widespread implementation and acceptance of dual polarized radar systems for a number of reasons, as will be discussed.

Figure 1:
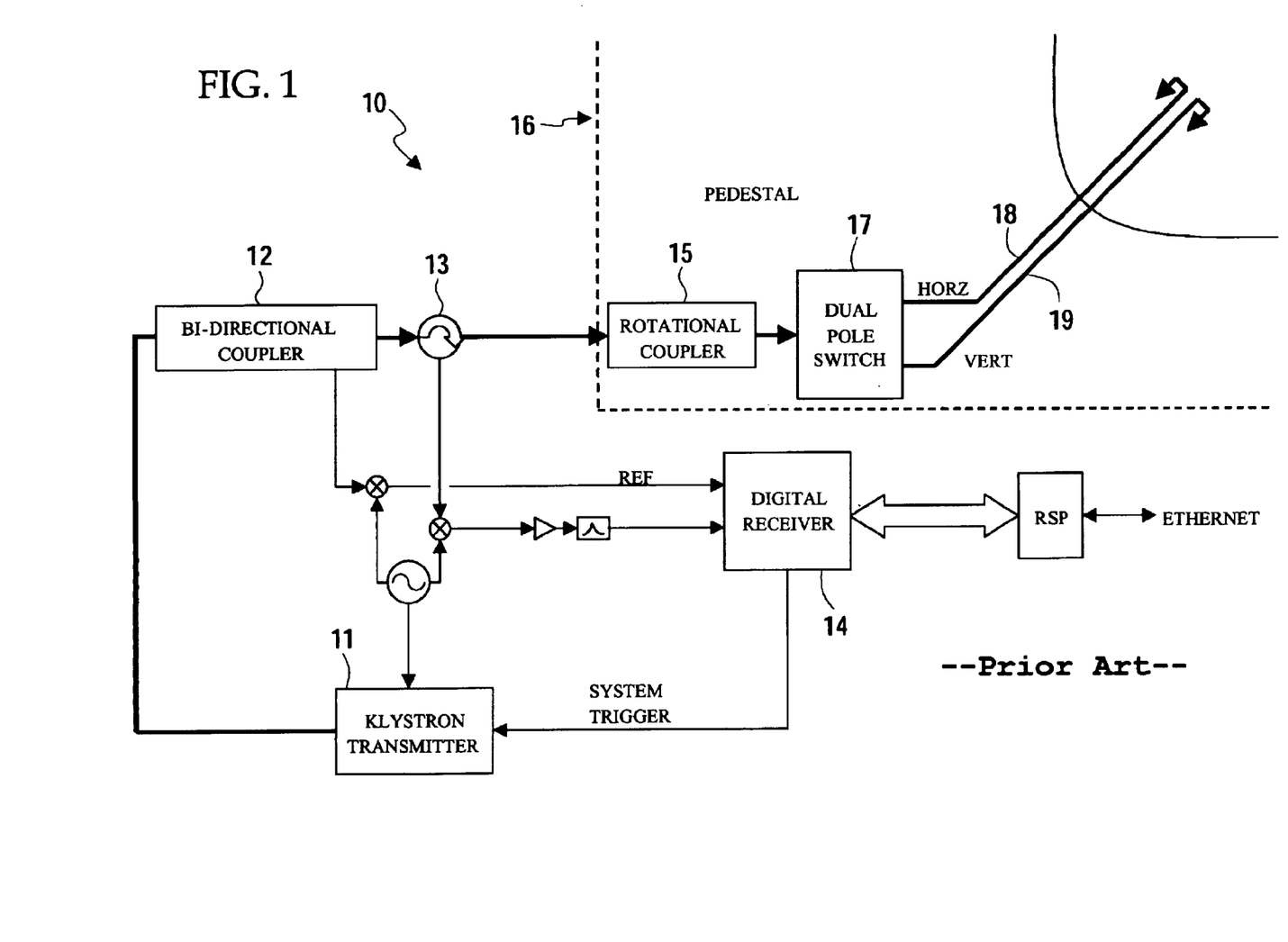
FIG. 1 is a diagram of a representative alternating dual polarization radar system known in the art.

Current dual polarization weather radar systems switch between polarization modes on a pulse by pulse basis as shown in representative system 10 at FIG. 1. To switch between polarization modes, a high power, high speed waveguide switch 17 (referred to in the industry by the generic term "waveguide orthomode switch") to transfer the transmitted energy between a horizontally oriented waveguide 18 and a vertically oriented waveguide 19. The waveguide phase shift is induced by Faraday rotation, which is a well known technique in the industry. This representative system includes elements known in the art, such as a Klystron based transmitter 11, a bi-directional coupler 12, a channel circulator 13, a digital receiver 14, rotational couplings 15 such as elevational and azimuth joints, and the requisite pedestal mounting 16 with feed horns and antenna.

Such a representative system is similar to the one disclosed by Zrnic in U.S. Pat. No. 5,500,646, except that Zrnic discloses a theoretical simultaneous dual polarized radar system by replacing the orthomode switch with a power splitter and an orthomode coupling at the antenna feed horn. Zrnic also worked out the various calculations pertaining to simultaneous dual polarization radar systems as recorded in the '646 patent, not already known in the industry, and such calculations are hereby incorporated by reference for background information into this disclosure and are applicable for the presently disclosed systems. While Zrnic displays a theoretic simultaneous dual radar system, the presently disclosed systems offer improvements to the Zrnic model to allow for real-world implementation and practical application of the Zrnic model to modern weather radar systems, as will be described. A number of systems exist today for the actual capturing of radar reflectivity data and incorporation into a local workstations or a nation-wide network of radar installations. One such system is disclosed in a white paper authored by A. Zahrai and D. Zrnic entitled Implementation of Polarimetric Capability for the WSR-88D (NEXRAD) Radar, published in American Meteorological Society in 1997 in section 9.5, which is hereby incorporated by reference. Additional comments pertaining to the capturing of reflectivity data and the processing of such data will not be made as these incorporated references describe the basic theory and operation of such systems and such information is already understood in the industry and not necessary for a complete understanding of the herein described invention.

For dual alternating dual polarization systems, a primary practical problem is the limitations encountered in the use of the high power switch 12. These switches are specialized pieces of equipment and tend to be very expensive and difficult to maintain. In addition they tend to exhibit relatively low isolation capability between the two modes. Manufactures familiar with the installation and maintenance of these systems in the field have found the reliability of the high power, dual polarization switches to decrease as the transmission frequency decreases, thereby limiting the practical implementation of dual polarization weather radar systems.

The dual polarization switch 12 is a ferrite based phase shifter. The switch operates by establishing a magnetic field in the ferrite core before the transmission of the pulse. The coupling of the magnetic field and the electromagnetic pulse causes Faraday rotation, i.e. rotation of the plane of polarization as the pulse passes through the ferrite medium. Through this process, the energy from the pulse is directed to one of two output ports, a horizontally oriented port and a vertically oriented port.

The size of the ferrite core is highly dependent upon the wavelength and hence frequency of the radar system. The longer the wavelength, the larger the ferrite core and the greater the doped surface area which will absorb microwave energy. Those skilled in the art currently believe that switch failures in the lower relative frequency rate of S-band (e.g. 10 cm wave lengths) are due to the changes in crystalline structure of the ferrite material resulting from the increased energy absorption at this frequency. At higher frequencies, e.g. C and X bands, manufactures have experienced less failure issues, but still encounter some problems. Other organizations have implemented mechanical rather than electromagnetic switches in S-band systems. However, mechanical switches have other limitations, known in the art, such as a fixed operating frequency for a selected switch assembly, which limits the operational radar system parameters to a fixed pulse interval period.

Another limitation of current alternating dual polarization radar systems is long dwell times and velocity range reductions. Any received reflection signal resulting from either polarization modes is assumed to come from the same scatterers (e.g. hydrometeors). In order to correlate the data from both the horizontally polarized and vertically polarized channels in current systems utilizing a waveguide switch, a single polarization pulse is transmitted followed by a period of delay (the dwell time) while reflections signals are being received. The opposing polarity pulse is subsequently sent and additional data is received by the same (single) receiver chain during a second dwell time. Reception of reflection signals, therefore, occurs during these two dwell periods during antenna rotation within a single beamwidth, resulting in a longer total dwell time for each beamwidth interrogation. Similarly, since the dwell time for each beamwidth interrogation (vertical+horizontal) is doubled, computational velocity perception is halved, thereby limiting the ability of current systems to resolve relatively high wind velocities in radar returns.

Additionally, practical problems exist in the above referenced Zrnic models. Transmission of wave pulse trains over long waveguides introduces phase and amplitude errors in the waveform which can interfere with the processing of radar reflectivity signals. Also, transmitting radar pulse trains through the azimuth and elevational joints introduces additional errors causes signal attenuation. Such errors require complex compensation processing in the received radar returns limiting the reliability of reflectivity data in simultaneous dual polarization weather radar systems.

Therefore, what is needed is an improvement in dual polarization weather radar systems from the current methods of alternating polarization modes to simultaneous dual polarization modes to solve issues such as long dwell times and velocity range reductions, and to eliminate expensive and hard to maintain dual polarization switches currently employed in dual polarization weather radar systems.

SUMMARY OF THE INVENTION

It is the object of the present invention to provide an improved simultaneous dual polarization radar system.

It is another object of the present invention to provide an improved simultaneous dual polarization radar system having the radar receiver positioned above the elevation rotary coupler in the radar pedestal and to eliminate the need for a high speed dual polarization switch.

It is yet another object of the present invention to provide an improved simultaneous dual polarization radar system having the radar receiver positioned above the elevation rotary coupler on the radar pedestal and being adapted for Klystron based transmissions.

Another object of the present invention is to eliminate costly and error prone components in current simultaneous dual polarization radar systems and to reduce negative environmental and temporal effects, and reduce system maintenance requirements.

A further object of the present invention is to provide a simultaneous dual receiving polarization radar system optimized to collect the linear depolarization ratios of areas of interest in the atmosphere in an economical manner.

In summary, a simultaneous dual polarization radar system is disclosed that utilizes a RF power divider to replace the high speed dual polarization switches used in current systems to allow for transmission and reception in both horizontal and vertical modes simultaneously. Embodiments of the current systems also teach the repositioning of critical receiver components above the elevation rotary coupler in the radar pedestal to avoid radar emission pulse train corruption due to waveguide phase error introductions and to fully capitalize on the simultaneous transmission of polarized signals. A bypass switch is also introduced to allow for mode switching of a radar system and a dual polarization reception design is shown to allow for the economical capturing of linear depolarization ratios of selected atmospheric areas. The disclosed embodiments eliminate the current problems experienced in modern dual polarization radar system of long dwell times and velocity range reductions. Also, the disclosed designs eliminate the relatively expensive and unreliable polarization switch of current systems.

BRIEF DESCRIPTION OF THE DRAWINGS

A dual polarization radar system incorporating the features of the invention is depicted in the attached drawings which form a portion of the disclosure and wherein.

DESCRIPTION OF THE PREFERRED EMBODIMENTS

Figure 2:
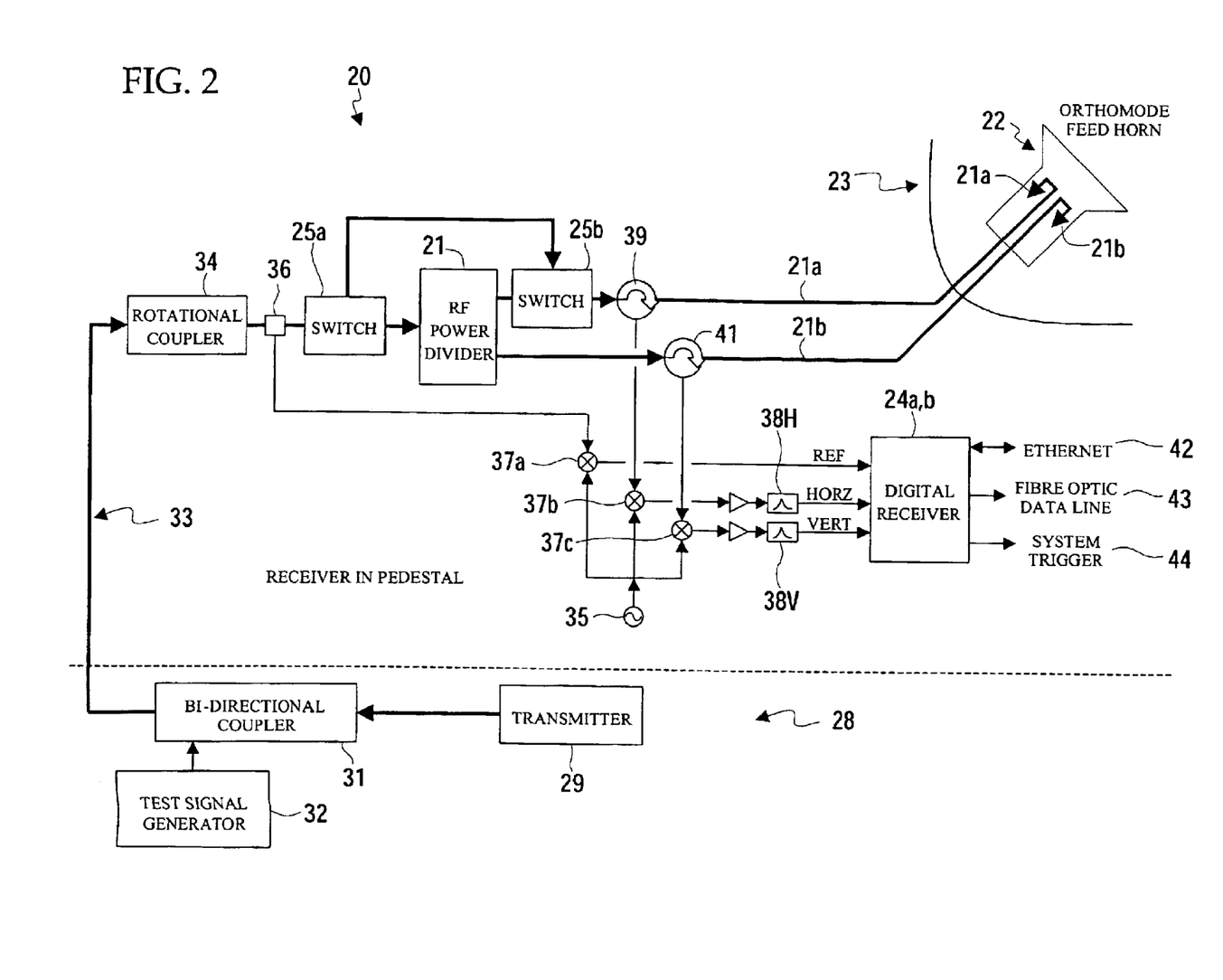
FIG. 2 is a diagram of a preferred simultaneous dual polarization radar system having the radar receiver optionally positioned above the elevated rotary coupler in the radar pedestal with an optional power divider bypass.

Referring to the drawings for a better understanding of the function and structure of the invention, FIG. 2 shows a block diagram representation of a relatively economical solution to create an improved dual polarization radar system 20. A radio frequency ("RF")power divider 21 splits the transmitted energy into components 21a, 21b that are transmitted to each of the polarization feeds 21a,b of the orthomode feed horn 22, appropriately positioned on a parabolic antenna 23. Two receivers are utilized 24a,b, one for each polarization mode as shown. A suitable power divider as well as related waveguide coupling elements can be obtained from Coleman Microwave Co., located in Edinburg, Va.

The high speed switch (FIG. 1, element 17) utilized in current dual polarized radar systems has been replaced in the current design by the RF power divider 21. In addition, two circulators, sometimes referred to as "duplexers" in the industry, a horizontal feed circulator 39 and a vertical feed circulator 41, have been added to provide transmitter and receiver isolation. The circulators utilized are typical ferrite circulators with preferably three, but possibly four ports— four ports giving better isolation and reflection characteristics. A suitable circulator for the present system is model part number CC#-35 available from Ferrite Components, Inc. A second receiver 24b has also been added. The second receiver 24b can be an entire second receiver system, or a second channel of a multi-channel receiver system as shown. Similarly, depending upon the associated radar applications, a signal processor may be integrated into the receiver (possibly utilizing dual signal processors), one for each channel, and a communications processor may provide data integration between the receiver and the signal processors, as is known in the art. An integrated receiver-signal processor design such as can be found in dual channel signal processing boards currently available is simpler, easier to maintain, and hence more desirable. Lassen Research manufactures a suitable digital receiver design under the "NDRX" part number series that includes the necessary signal processing power to meet the processing demands of a simultaneous dual polarization system.

Transmitter subsystem 28 can be based upon various known types, such as a power amplifier, a solid state amplifier, a power oscillator (e.g. a magnetron), or a pulsed Klystron amplifier. A bi-directional coupler 31 connects the output from the transmitter 29 to primary waveguide conduit 33 and allows for test signal injection into the radar system from a test signal generator 32.

Waveguide signal feedback port 36 (i.e. a signal tap) provides a reference signal to the digital receiver 24 via signal mixers 37a–c. The reference signal provides a feedback mechanism to the receiver 24 to compensate for phase shifts introduced in the waveguide 33 or in one or more rotational couplers 34, among other types of signal changes that might occur after transmitter pulse discharge. The RF power divider 21 then divides the transmitter signal into two equal waveguides of equal power. Circulators 39 and 41 then isolate the output from power divider 21 to allow for propagation of reflected signals through waveguides 21a and 21b to be collected by the digital receiver 24 after being amplified through power amplifiers 38H and 38V.

Figure 3:
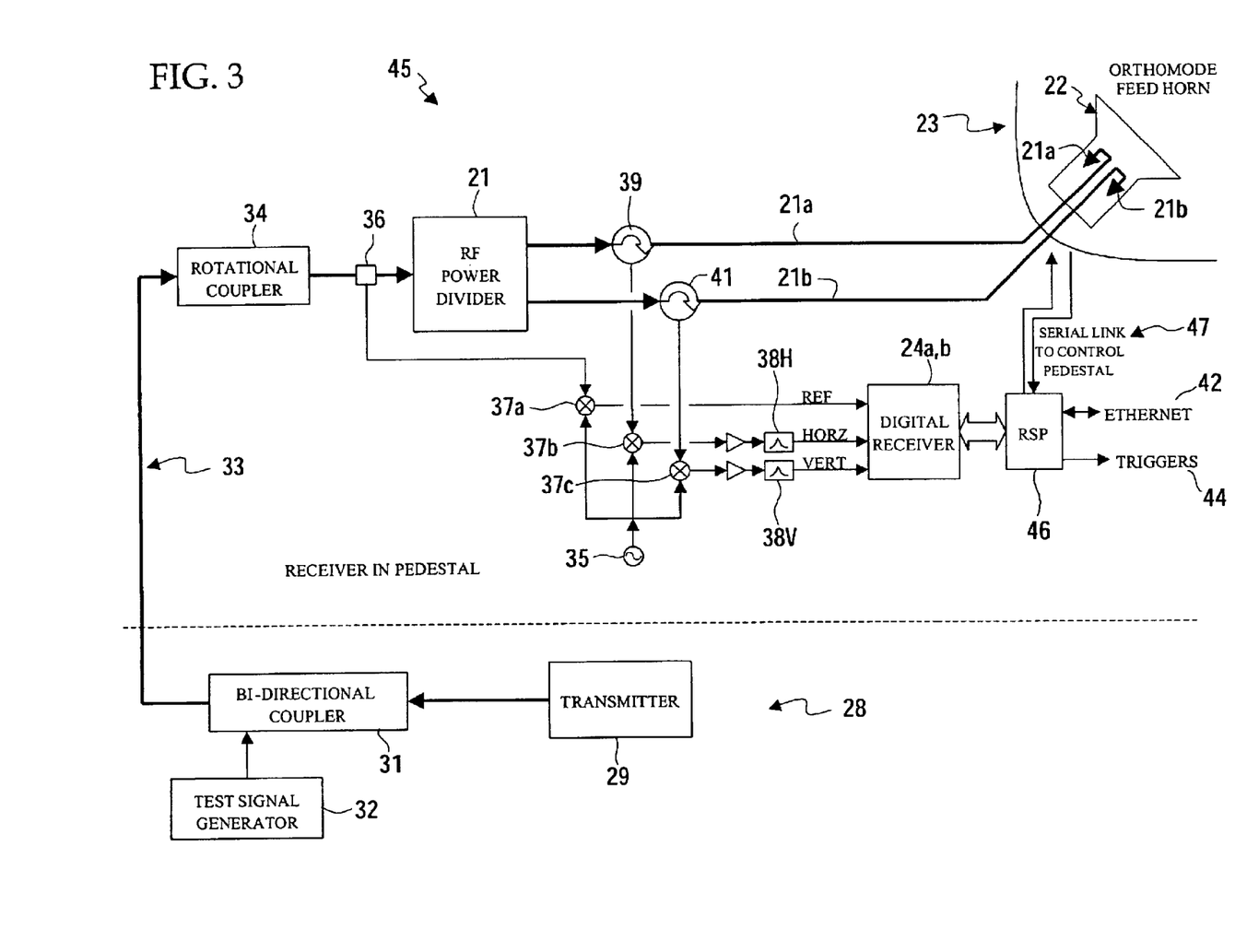
FIG. 3 is a diagram of a preferred simultaneous dual polarization radar system having the radar receiver positioned above the elevated rotary coupler in the radar pedestal.
Figure 4:
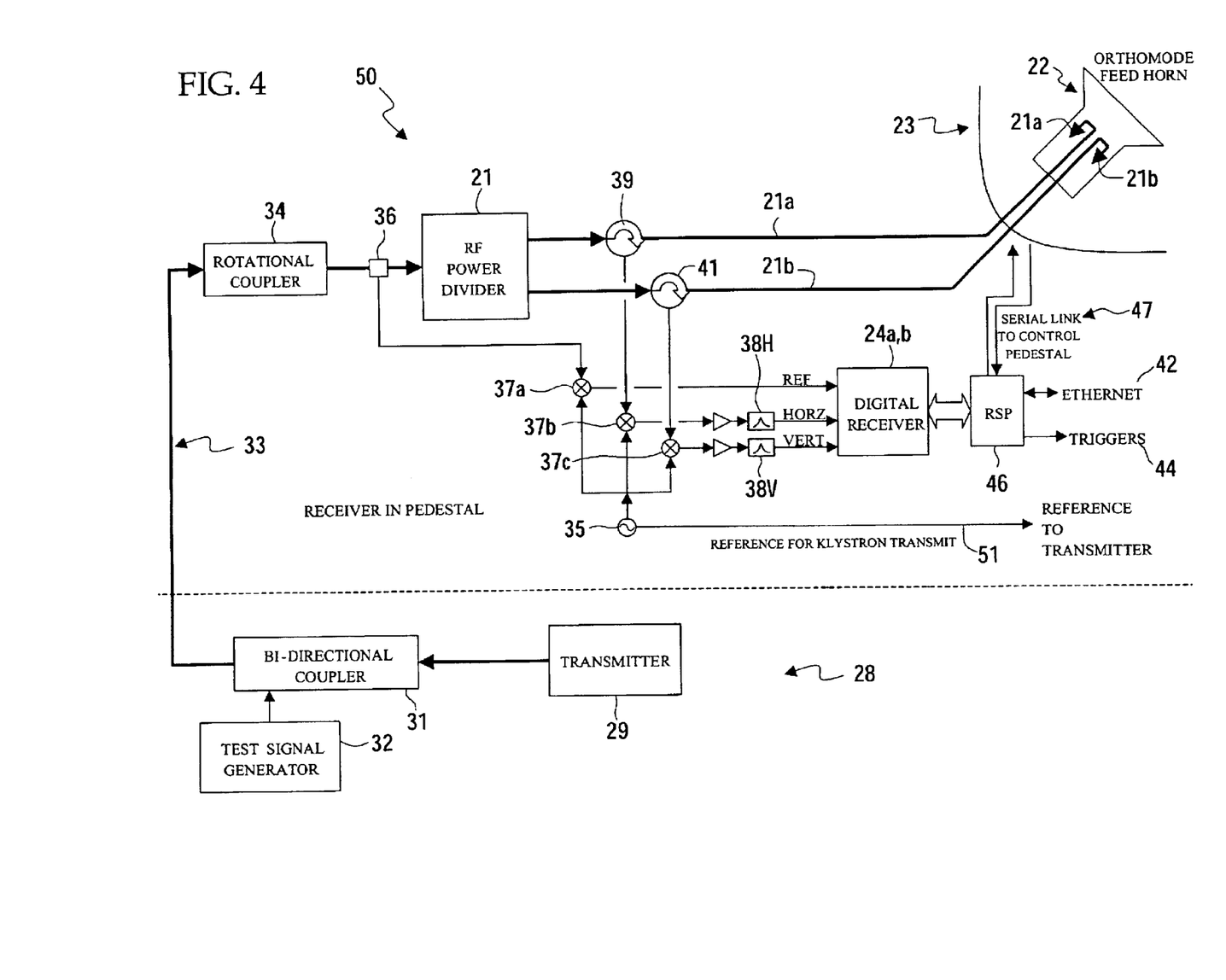
FIG. 4 a diagram of a preferred simultaneous dual polarization radar system having the radar receiver positioned above the elevated rotary coupler in the radar pedestal to and incorporating a Klystron transmitter; and, FIG. 5 is a diagram of a low cost dual polarization receiving system to allow for collection of linear depolarization ratios.

An Ethernet transceiver 42 allows for data output and direct programming of the receiver 24 or programming of a connected radar signal processor (See FIGS. 3 and 4). A fiber optic data line 43 allows for the transfer of large amounts of real-time radar data to remote data processing and display systems. System trigger 44 provides a method for synchronized initiation of the transmitter subsystem 28 under the digital receiver's control. Antenna rotation and positioning occurs via serial link control 47 to various drive motors in the antenna pedestal from the radar signal processor 46 (See FIGS. 3 and 4). The configuration shown in FIG. 2 preferably positions the receiver electronics in the radar antenna pedestal above the elevation rotary coupler. However, the disclosed configuration can also be utilized in known configurations in which the receiver electronics are positioned below the azimuth coupler, such as in an adjacent electronics enclosure.

As will be understood by those in the art, one potential disadvantage of Zrnic's '646 system is the division of transmit power. An operator wanting to transmit and analyze data in a single polarization mode at 500 KW will require, for example, a 1 MW transmitter.

A solution to this issue is to insert a mechanical transfer switch into the waveguide structure 33 that allows the waveguide signal to bypass the power divider 21, as shown. Mechanical waveguide switches 25a,b are used to transfer energy around the RF power divider 21, thus bypassing the function it provides. Switch 25a is positioned just before the input port to the divider 21 so that the full power radar pulse train can be redirected around the divider 21 to switch 25b on demand. The system is suitably designed such that the switches do not operate unless the transmitted power is off so that no switching in this mode can take place with the transmitter generating RF energy pulses. Thus, full transmit power can be achieved in a single polarization mode. This bypass configuration allows for maximum pulse train power to be applied to the horizontally polarized channel 21a, while allowing for reception in both polarization modes. As will be understood to those in the industry, transferring power to a single polarization does not limit the possibility of receiving in both vertical and horizontal polarizations. In the bypass mode, linear depolarization ratio ("LDR") information on selected atmospheric areas can be obtained. The waveguide transfer switches utilized in this embodiment are relatively slow mechanical switches operating on the order of a few hundred milliseconds and are actuated through either a solenoid or motor drive. Suitable mechanical switches are offered by Advanced Switch Technology, Kingston, Ontario, model# AST-187, or similar switches.

Another embodiment of the basic simultaneous dual polarization radar system 10 disclosed in FIG. 1 is a "receiver over elevation" configuration 45 shown in FIG. 3. The primary benefit of this embodiment is increased performance in simultaneous dual polarization systems versus cost of implementation. In the embodiment of FIG. 3, the receiver and signal processor(s) are located in an environmentally controlled enclosure located above the elevation rotary coupler 34 in the radar pedestal. This configuration minimizes the number of necessary waveguide channels traveling through the rotational coupler. Dual channel rotary couplers are expensive and they also introduce phase errors between the channels that vary with rotation. Placing the receivers above the elevation coupler facilitates the use of single channel rotary couplers for both the azimuth and elevation axes.

The receiver over elevation configuration also places the receivers 24 very close, physically, to the antenna 23, and allows for the relocation of the radar signal processor(s) 46 to be placed inside a suitable environmental enclosure adjacent to the digital receiver 24. If the signal processor(s) 46 were physically located near the transmitter, or a workstation for that matter, data transmission from the receivers to the signal processors could be a problem. First, a complex and expensive slip ring would be required to transmit the data. Second, streaming raw I/Q data digitally over long distances introduces errors into the data resulting from noise introduction in the transmission cables. Due to the relatively large data bandwidth required in a dual simultaneously polarized radar system, differential parallel transmission lines must be utilized and data integrity can be impacted in electrically noisy environments. However, recently, technology has advanced such that the signal processor(s) may be placed together with the receiver at the antenna, thereby allowing for direct transmission of resultant radar data moments to a connected workstation. This simplifies the slip ring assembly by requiring only paths for power, reference, Ethernet communications, and antenna motor drives.

The active electronics for the embodiment disclosed in FIG. 3, such as the receiver and signal processor, are located in a small shielded enclosure. The enclosure should be environmentally controlled with, for example, solid state heating and cooling units. Maintaining a stable thermal environment is crucial to proper operation of the radar system. Components may fail under high thermal loads and a simultaneous dual polarization radar system may experience changes in performance as temperature fluctuates. For example, changes to the phase and frequency stability could be encountered, thereby limiting the ability to receive reliable weather data. However, maintaining a known environment can be accomplished by utilizing solid state (e.g. Peltier) cooling-heating technology. In light of recent component size reductions and power consumption, environmental control and repositioning of the above described components into a location adjacent to the radar antenna have become feasible. Therefore, Peltier based temperature controls provide a satisfactory solution to controlling encountered environmental conditions.

Other mechanical isolations in the present systems also must be attended to. For example, in Klystron based systems the system components must be isolated from vibration. The synthesizer in the transmitter subsystem 29 is a very sensitive component and proper frequency generation is accomplished with a stable crystal oscillator circuit or a numerically controlled oscillator 35. The crystal itself is sensitive to vibration which can affect the resonance frequency. Small changes (modulations) to the natural frequency of this crystal are seen as induced phase noise, which destroys the ability to detect small changes in weather element signal returns. Other components are affected as well, but the single most sensitive component is the synthesizer. Hence, proper vibration isolation is essential to proper operation and functioning of simultaneous dual polarization radar systems.

Another important design consideration for simultaneous dual polarization radar systems is RF isolation. The region near the high power RF components, such as the power divider 21, is a dynamic field electrically and magnetically. Proper isolation techniques must be used to keep unwanted RF from masking smaller level desired signals. Typical isolation design techniques such as metal barrier shielding, utilizing ferrite magnetic cores to minimize common mode noise, and the utilization of "Mu" metal (special magnetic material) shielding. While these techniques are known in the industry, special attention to these details must be made in simultaneous dual polarization radar systems.

For magnetron based radar systems, the receiver measures the phase-frequency relationship on a pulse basis. A burst sample is obtained prior to the RF Power divider 21 at tap 36 and transmitted via a coupler 37a to the receiver 24 for processing. This technique yields the highest possible coherency, approaching the theoretical limit for magnetron systems. Suitable coaxial magnetrons can be purchased from Communications and Power Industries, Beverly Division ("CPI"), located in Beverly, Mass., offering a C band 250 KW unit under the model number VMC-1891A. Other frequency and power configuration units are also available from CPI to enable proper sampling.

Alternatively, Klystron based radar systems 50 as shown in FIG. 4 require a local oscillator positioned at the receiver and a timing reference signal 51 used to establish phase-lock to a master synthesizer located at the transmitter 29. As in a magnetron system 45 shown in FIG. 3, the actual transmitted burst signal is sampled and processed by the receiver via tap 36. Therefore, compensation for the phase shift introduced by the amplification process is automatic, again allowing for very high coherency values. Suitable pulsed Klystron amplifiers can be obtained from CPI under the part number series VKC or VKS.

Figure 5:
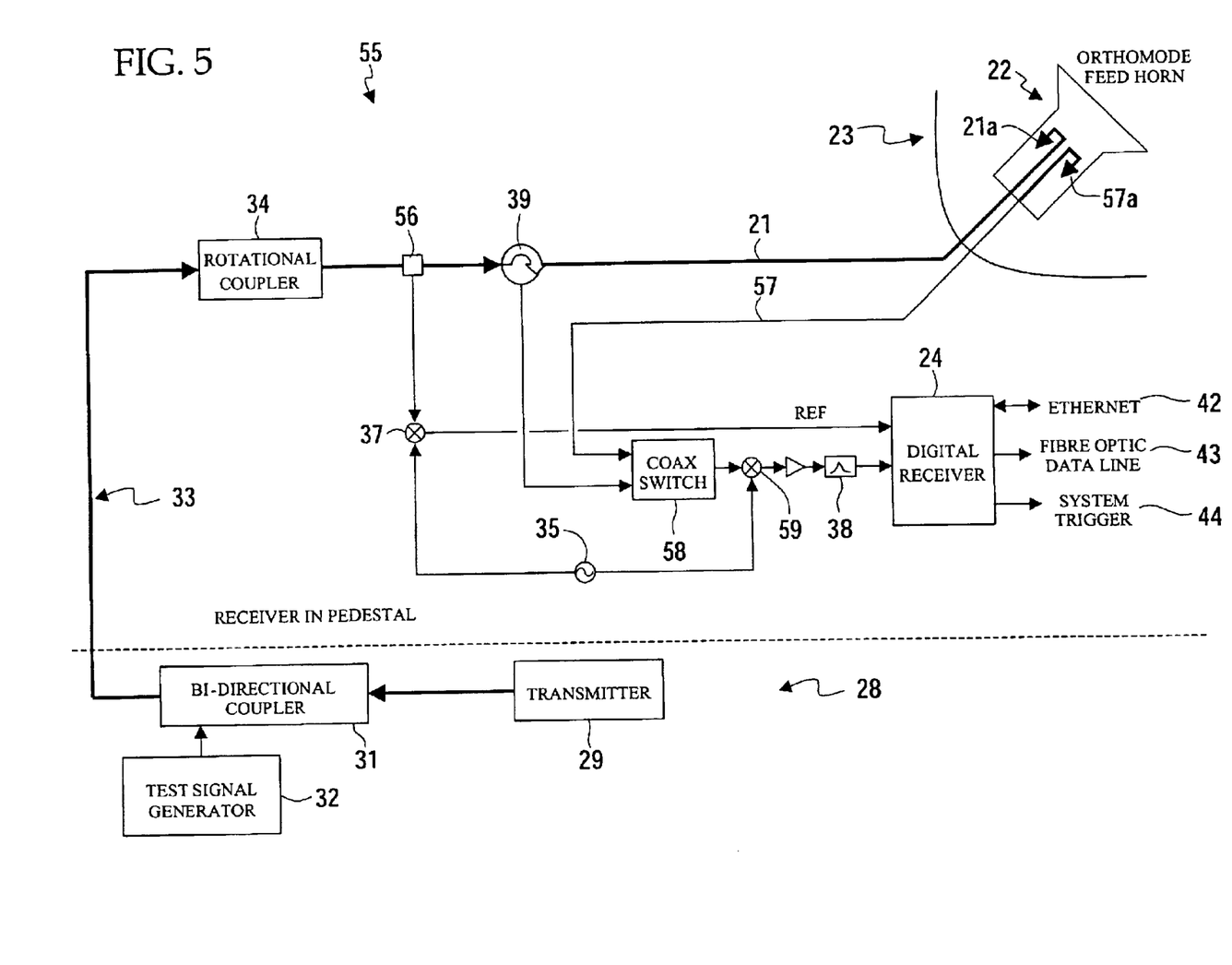

Referring now to FIG. 5, it may be seen that a relatively inexpensive receiver over elevation coupling design can be obtained implementing dual simultaneous polarity reception. As shown, bypass 25 and power divider elements 21 have been replaced by a tap port 56 that allows for reference signals to be shunted to mixer 37 and mixer 59. The maximum power, horizontally polarized pulse train 21 proceeds through circulator 39 and to feed horn 22 via port 21a. The orthomode feed horn then simultaneously receives both horizontally (21a) and vertically (57a) polarized reflection signals, and a coaxial switch 58 under radar processor control (or other suitable logic control) processes either the horizontal 21 or vertical 57 reflection components as dictated by associated radar processor control software. The resultant system reduces the receiver hardware required and allows for economic reception and processing of LDR data.

The disclosed embodiments teach a practical dual polarization weather radar system obviating the need for current high power, high speed dual polarization switches and allow for the transmitting and receiving in both horizontal and vertical modes simultaneously. These new designs eliminate the current problems experienced in current dual polarization radar system of long dwell times and velocity range reductions. Moreover, the expense and in some implementations unreliable polarization switch is eliminated.

The benefits of practical simultaneous dual polarization systems are substantial. They provide much more information about hydrometeors, allowing for the determination of an entire scattering matrix and the correction for partial beam blockage via differential phase techniques, improved rainfall estimates, and improved hydrometeor classification.

While I have shown my invention in one form, it will be obvious to those skilled in the art that it is not so limited but is susceptible of various changes and modifications without departing from the spirit thereof.

References

1. Doviak, R. J., V. Bringi, A. Ryzhkov, A. Zahrai, D. S. Zrnic'. *Considerations for Polarimetric Upgrades to Operational WSR-88D Radars.* J. Atmos. and Oceanic Tech, 2000. 17, 257–278.
2. Liu, Y., J. W. Conway, E. A. Brandes, A. V. Ryzhkov, J. Vivekanandan, D. S. Zrnic, and R. Oye. *The use of polarization data in the operational identification of hydrometeor and non-hydrometeor targets.* Preprints, 29th Conf. Radar Meteor. Montreal, Canada: American Meteorological Society 1999:178–179
3. Ryzhkov A., R. López, R. Fulton, D. Zrnic, T. Schuur, and Y. Liu. *"Hydrometeor classification with a polarimetric radar for improved rainfall measurements and detection of hail and electrically charged regions.* Preprints, 29th Conference on Radar Meteorology Montreal, Canada: American Meteorological Society, 1999: 289–292.
4. Ryzhkov, A. V. and D. S. Zrnic. "Discrimination between rain and snow with a polarimetric radar." *Journal of Applied Meteorology* 1999: 1228–1240.
5. Ryzhkov, A. V., D. S. Zrnic, and R. Fulton. "Area Rainfall Estimates Using Differential Phase." *Journal of Applied Meteorology* 2000: 263–268.
6. Skolnik, Merrill I. *Introduction to Radar Systems.* New York: $3^{rd}$ ed 2001.
7. Vivekanandan, J., D. S. Zrnic, S. M. Ellis, R. Oye, A. V. Ryzhkov, and J. Straka. "Cloud microphysics retrieval using S-band dual-polarization radar measurements." *Bulletin of the American Meteorological Society* 1999: 381–388.
8. Zahrai Allen and Dr. Dusan Zrnic. "Implementation of Polarimetric Capability for the WSR-88D (NEXRAD) Radar." Long Beach, Calif. *American Meteorological Society* 1997.
9. Zrnic, D. S., and A. V. Ryzhkov. "Polarimetry for weather surveillance radars." *Bulletin of the American Meteorological Society* 1999: 389–406.

Having set forth the nature of the invention, what is claimed is:

1. A weather radar system, comprising:
   a. an energy pulse train generator for producing radio emissions adapted for weather radar use;
   b. an antenna in electrical communication with said pulse train generator for transmitting said radio emissions into space in a controlled manner and for collecting reflected signals from objects of interest;
   c. an orthomode feed horn adjacent to said antenna for channeling reflectivity signals of disparate phase relative to one another into separate receiving channels;
   d. a receiver subsystem for processing reflectivity signals collected by said antenna, wherein said receiver subsystem is co-located with said antenna;
   e. at least one channel circulator electrically positioned between said antenna and said energy pulse train generator for isolating said radio emissions from said receiver subsystem; and,
   f. a coaxial switch in electrical communication with said receiver subsystem and said at least one circulator for selectively connecting said receiver subsystem with said separate receiving channels in response to preprogrammed logic.

2. A radar system as recited in claim 1, further comprising a single channel rotary coupler electrically connecting said energy pulse train generator to said antenna.

3. A radar system as recited in claim 2, further including a wave guide signal port electrically located between said energy pulse train generator and said at least one circulator for extracting a reference signal from said radio emissions for use by said receiver subsystem.

4. A radar system as recited in claim 3, wherein said orthomode feed horn is positioned on said antenna and produces dual emission components substantially out of phase with each other by 90 degrees.

5. A radar system as recited in claim 4, further comprising an azimuth rotary coupling to allow rotation of said antenna, an elevation rotary coupling positioned proximal to said azimuth rotary coupling to allow declination and elevation of said antenna, and wherein said receiver subsystem is positioned above said elevation and azimuth couplings for processing reflectivity signals collected by said antenna.

6. A radar system as recited in claim 5, wherein said antenna is parabolic in shape.

7. A radar system as recited in claim 6, wherein said radar signal processor is in electrical communication with a remote terminal for remote viewing of processed radar data.

8. A radar system as recited in claim 7, wherein said energy pulse train generator comprises a Klystron signal generator and wherein said radar system further comprises a reference signal tap in electrical communication with one of said circulators to provide a reference signal to said klystron signal generator.

9. A radar system as recited in claim 1, further comprising a radar signal processor in electrical communication with said receiver subsystem for processing reflected signal returns received by said receiver subsystem, wherein said orthomode feed horn is positioned on said antenna and produces dual emission components substantially out of phase with each other by 90 degrees.

10. A weather radar system, comprising:
    a. means for generating radio emissions adapted for weather radar use;
    b. an antenna in electrical communication with said radio emissions generating means for transmitting said radio emissions into space in a controlled manner and for collecting reflected signals from objects of interest;
    c. means positioned on said antenna for channeling reflectivity signals of disparate phase relative to one another into separate receiving channels;
    d. means in electrical communication with said channeling reflectivity signals means for receiving reflectivity signals collected by said antenna, wherein said receiving means is co-located with said antenna;
    e. means in electrical communication with said antenna and said receiving means for isolating said generated radio emissions from said receiving means; and,
    f. means electrically positioned between said receiving means and said channeling reflectivity signals means for selectively connecting said receiving means with said separate receiving channels in response to preprogrammed logic.

11. A radar system as recited in claim 10, further comprising a single channel rotary coupler electrically connecting said radio emissions generating means to said isolation means.

12. A radar system as recited in claim 11, further including a wave guide signal port electrically located between said radio emissions generating means and said isolation means and further in electrical communication with said receiver means for extracting a reference signal from said radio emissions for use by said receiver means.

13. A radar system as recited in claim 12, further including means to permit rotation of said antenna and means to allow raising and lowering of the elevation angle of said antenna, and wherein said receiving means is located above said rotational and elevation means.

14. A method for utilizing dual polarized radar emission reflection in a radar system to enhance weather reflectivity data, the steps comprising:
    a. generating radio emissions suitable for radar system usage;
    b. passing said radio emissions to a radar antenna;
    c. directing said radio emissions into space from said antenna in a controlled manner;
    d. using said antenna to collect polarized emission reflections from objects of interest through an adjacent orthomode feed horn;
    e. said feed horn channeling and orthogonally parsing said reflections signals into duel receiving channels;
    f. using a coaxial switch to intermittently connect each receiving channel to a radar receiver subsection in response to pre-programmed instructions; and,
    g. processing said reflections in said receiver subsystem to produce radar acquisition data.

15. A method as recited in claim 14, wherein said radar system includes at least one rotary coupler to assist in said directing step and wherein said processing step occurs in a receiver subsystem located above said at least one rotary coupler.

16. A method as recited in claim 15, further comprising the step of conducting said radio emissions from said radio emission generator to said antenna through a single channel rotary coupler.

17. A method as recited in claim 16, wherein said coaxial connection step occurs without passing said collected polarized emission reflections through a rotary coupling.

18. A weather radar system, comprising:
   a. means for generating radio emissions adapted for weather radar use;
   b. an antenna in electrical communication with said radio emissions generating means for transmitting said radio emissions into space and for collecting reflected signals from objects of interest;
   c. means positioned on said antenna for channeling reflectivity signals of disparate phase relative to one another into separate receiving channels, wherein only one of said channels is connected to said radio emissions generating means for transmission of said radio emissions;
   d. means in electrical communication with said channeling reflectivity signals means for receiving reflectivity signals collected by said antenna; and,
   e. means electrically interspersed between said radio emissions generating means, said antenna, and said receiving means for isolating said generated radio emissions from said receiving means while allowing reflectivity signals to flow to said receiving means from said channeling reflectivity signals means.

19. A weather radar system as recited in claim 18, wherein said receiving means is co-located with said antenna.

20. A radar system as recited in claim 19, further including means to permit rotation of said antenna and means to allow raising and lowering of the elevation angle of said antenna, and wherein said receiving means is located above said rotational and elevation means.

\* \* \* \* \*